(12) United States Patent
Tang

(10) Patent No.: US 11,838,881 B2
(45) Date of Patent: Dec. 5, 2023

(54) METHOD AND DEVICE FOR TRANSMITTING SYNCHRONIZATION SIGNAL BLOCK BASED ON ADDED TIME WINDOW, AND STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/019,018

(22) Filed: Sep. 11, 2020

(65) Prior Publication Data

US 2020/0413357 A1    Dec. 31, 2020

Related U.S. Application Data

(63) Continuation of application No. PCT/CN2018/080625, filed on Mar. 27, 2018.

(51) Int. Cl.
*H04W 56/00* (2009.01)
*H04W 76/27* (2018.01)
(Continued)

(52) U.S. Cl.
CPC ......... *H04W 56/001* (2013.01); *H04L 47/826* (2013.01); *H04W 16/14* (2013.01);
(Continued)

(58) Field of Classification Search
CPC ... H04J 3/16; H04W 56/001; H04W 28/0908; H04W 36/0007; H04W 72/005; H04B 1/662; H04L 43/106; H04L 1/1832; H04L 1/187; H04L 47/27; H04L 47/225; H04L 47/826
See application file for complete search history.

(56) References Cited

U.S. PATENT DOCUMENTS

2016/0056935 A1    2/2016   Damnjanovic et al.
2016/0330678 A1    11/2016  Yoon et al.
(Continued)

FOREIGN PATENT DOCUMENTS

CN    105162562 A    12/2015
CN    105376869 A    3/2016
(Continued)

OTHER PUBLICATIONS

R2-151178, "Considerations of measurement Issues in LAA", Apr. 20-24, 2015, pp. 1-5 (Year: 2015).*
(Continued)

*Primary Examiner* — Salvador E Rivas
(74) *Attorney, Agent, or Firm* — PERKINS COIE LLP

(57) ABSTRACT

Disclosed are a method and device for transmitting a synchronization signal block (SSB), and a storage medium. The method comprises: when an SSB is to be transmitted in an unlicensed band, lengthening a time window for transmission of an SSB; and transmitting the SSB in the lengthened time window. Implementing the solution of the present invention can increase a success rate of SSB transmission.

5 Claims, 3 Drawing Sheets

(51) Int. Cl.
H04W 16/14 (2009.01)
H04W 72/0446 (2023.01)
H04L 47/70 (2022.01)
H04W 28/08 (2023.01)

(52) U.S. Cl.
CPC ....... H04W 72/0446 (2013.01); H04W 76/27 (2018.02); *H04W 28/0908* (2020.05)

(56) References Cited

U.S. PATENT DOCUMENTS

| | | | | |
|---|---|---|---|---|
| 2016/0337997 | A1* | 11/2016 | Huang | H04W 16/14 |
| 2017/0353866 | A1 | 12/2017 | Gou et al. | |
| 2019/0069271 | A1* | 2/2019 | Reial | H04W 68/02 |
| 2020/0037277 | A1* | 1/2020 | Huang | H04W 56/0015 |
| 2020/0163037 | A1* | 5/2020 | Zheng | H04W 74/0808 |
| 2020/0205095 | A1* | 6/2020 | Åström | H04W 48/12 |
| 2020/0275409 | A1* | 8/2020 | Gonzalez | H04W 84/027 |
| 2020/0358547 | A1* | 11/2020 | Liu | H04J 11/0069 |
| 2021/0051618 | A1* | 2/2021 | Yang | H04W 56/0045 |
| 2021/0084511 | A1* | 3/2021 | Harada | H04W 24/10 |
| 2021/0176755 | A1* | 6/2021 | Liu | H04W 72/005 |

FOREIGN PATENT DOCUMENTS

| | | |
|---|---|---|
| CN | 105991210 A | 10/2016 |
| EP | 3091799 A1 | 11/2016 |
| KR | 20170037496 A | 4/2017 |
| KR | 20170047231 A | 5/2017 |
| WO | 2015113266 A1 | 8/2015 |
| WO | 2016182738 A1 | 11/2016 |

OTHER PUBLICATIONS

International Search Report dated Jan. 2, 2019 of PCT/CN2018/080625 (4 pages).
EPO, Extended European Search Report for European Patent Application No. 18912653.5, dated Feb. 9, 2021. 11 pages.
Huawei et al. "Considerations of Measurement Issues in LAA" R2-151178; 3GPP TSG-RAN WG2 Meeting #89bis; Bratislava, Slovakia; Apr. 20-24, 2015. 5 pages.
Nokia et al. "Potential solutions and techniques for NR unlicensed" R1-1802526; 3GPP TSG RAN WG1 Meeting #92; Athens, Greece; Feb. 26-Mar. 2, 2018. 11 pages.
Notice of Reasons for Refusal for Japanese Application No. 2020-547216 dated Jan. 28, 2022. 6 pages with English translation.
Notification of Reason for Refusal for Korean Application No. 10-2020-7027863 dated Feb. 28, 2022. 8 pages with English translation.
Examination Report for Indian Application No. 202027044395 dated Dec. 6, 2021. 6 pages with English translation.
Examiner's Report for Canadian Application No. 3093979 dated Oct. 14, 2021. 9 pages.
First Office Action of the Taiwanese application No. 108110491, dated May 4, 2022. 32 pages with English Translation.
Decision of Refusal for Japanese Application No. 2020-547216 dated Aug. 2, 2022. 4 pages with English translation.
Decision of Rejection for Taiwanese Application No. 108110491 dated Sep. 15, 2022. 3 pages with English translation.
Examiner's Report for Canadian Application No. 3093979 dated Jul. 29, 2022. 4 pages.
Notice of Final Rejection for Korean Application No. 10-2020-7027863 dated Sep. 29, 2022. 8 pages with English translation.
Examination Report for European Application No. 189126535 dated Apr. 5, 2023. 8 pages.
Examiner's Report for Canadian Application No. 3093979 dated Apr. 13, 2023. 5 pages.
Notice of Termination of Reconsideration by Examiners before Appeal Proceedings for Japanese Application No. 2020-547216 dated Mar. 7, 2023. 2 pages with English translation.
Reconsideration Report by Examiner before Appeal for Japanese Application No. 2020-547216 dated Feb. 24, 2023. 5 pages with English translation.
First office action of Australian application No. 2018415674 dated Sep. 21, 2023, 3 pages.

* cited by examiner

US 11,838,881 B2

METHOD AND DEVICE FOR TRANSMITTING SYNCHRONIZATION SIGNAL BLOCK BASED ON ADDED TIME WINDOW, AND STORAGE MEDIUM

CROSS-REFERENCE TO RELATED APPLICATION

This application is a continuation application of International Application No. PCT/CN2018/080625, filed on Mar. 27, 2018, the entire disclosure of which is hereby incorporated by reference.

TECHNICAL FIELD

The invention relates to wireless network technology, in particular to a method and a device for transmitting synchronization signal block, and a storage medium.

BACKGROUND

In a 5G system, a Primary Synchronization Signal (PSS), a Secondary Synchronization Signal (SSS) and a Physical Broadcast Channel (PBCH) jointly constitute a Synchronization Signal Block (SSB).

The SSB is transmitted periodically. During an SSB transmission period, the SSB is limited to a transmission window of 5 ms. A maximum quantity of the SSBs that may be transmitted is L. The value of L varies with an operating frequency band. For example, for an operating frequency band less than 3 GHz, the value of L is 4. For an operating frequency band between 3 GHz to 6 GHz, the value of L is 8. For an operating frequency band of 6 GHz to 52.6 GHz, the value of L is 64.

In the transmission window of 5 ms, the distribution of the SSB in a slot will be different for different Subcarrier Spacings (SCSs) and different operating frequency bands. FIG. 1 is a schematic diagram of the distribution of the SSB in a slot under different subcarrier spacings and different operating frequency bands in prior art. As shown in FIG. 1, it shows the distribution in a slot when the subcarrier spacing is 15 KHz and 30 KHz respectively, and L is 4 and 8 respectively. For example, when the subcarrier spacing is 15 KHz and L=4, the 4 SSBs are distributed within 2 ms, and at most 2 SSBs are distributed within each 1 ms.

Correspondingly, FIG. 2 is a schematic diagram showing the distribution of candidate locations for the SSB within one slot when the subcarrier spacing is 15 KHz and 30 KHz respectively in the prior art.

In the current 5G NR technology, a Carrier Sense Multiple Access/Collision Detection (CSMA/CD) method and a Carrier Sense Multiple Access/Collision Avoidance (CSMA/CA) method may be adopted in an unlicensed frequency band. A transmitting node may use a Listen Before Talk (LBT) mechanism to monitor a channel and determine whether the channel is idle before transmitting a signal.

For example, in the unlicensed frequency band, if a network device needs to transmit a signal to a terminal, it needs to sense a carrier of the unlicensed frequency band. In a specific implementation, the network device may firstly generate a random number before sensing. In a time range corresponding to the generated random number, if the carrier is sensed to be idle all the time, the network device may transmit the signal. Or, the network device may perform the carrier sensing within a time window with predetermined duration before the signal is required to be transmitted. If the carrier is sensed to be idle within this time window, the network device may transmit the signal.

Based on the LBT mechanism, in the 5 ms transmission window within one SSB transmission period, if the network device does not sense that the carrier is idle before transmitting the SSB, the SSB may not be transmitted successfully, thus reducing the transmission success rate of the SSB.

SUMMARY

In view of the foregoing, the present disclosure provides a method and a device for transmitting a synchronization signal block, and a storage medium.

Specific technical solutions are as follows.

A method for transmitting a synchronization signal block (SSB) includes: adding a time window for transmitting the SSB, when the SSB needs to be transmitted in an unlicensed frequency band; and performing an SSB transmission based on the added time window.

A method for transmitting a synchronization signal block (SSB) includes: performing, by a terminal, an SSB reception based on a time window for transmitting the SSB, wherein the time window is added by a network side.

A network device includes: an expansion unit and a transmission unit; wherein the expansion unit is configured to add a time window for transmitting an SSB when the SSB needs to be transmitted in an unlicensed frequency band; and wherein the transmission unit is configured to perform an SSB transmission based on the added time window.

A terminal device includes: a receiving unit; wherein the receiving unit is configured to perform an SSB reception based on a time window for transmitting the SSB, wherein the time window is added by a network side.

A computer device includes a memory, a processor and a computer program stored in the memory and executable on the processor, wherein the method as described above is implemented when the processor executes the program.

A non-transitory computer readable storage medium has a computer program stored thereon. When the program is executed by a processor, the method as described above is implemented.

Based on above introduction, it may be seen that, by adopting a solution of the present disclosure, when the SSB needs to be transmitted in the unlicensed frequency band, the time window for transmitting the SSB may be firstly added, and then the SSB may be transmitted based on the added time window. By adding the time window for transmitting the SSB, transmission opportunity of the SSB is increased, thus improving the transmission success rate of the SSB etc.

DETAILED DESCRIPTION

To make a technical solution of the present disclosure clearer and easier to understand, the solution of the present disclosure will be further explained with reference to accompanying drawings and implementations below.

It is apparent that described implementations are a part, but not all, of implementations of the present disclosure. Based on the implementations of the present disclosure, all other implementations obtained by a person of ordinary skill in the art without paying an inventive effort shall fall within the scope protected by the present disclosure.

Figure 1:
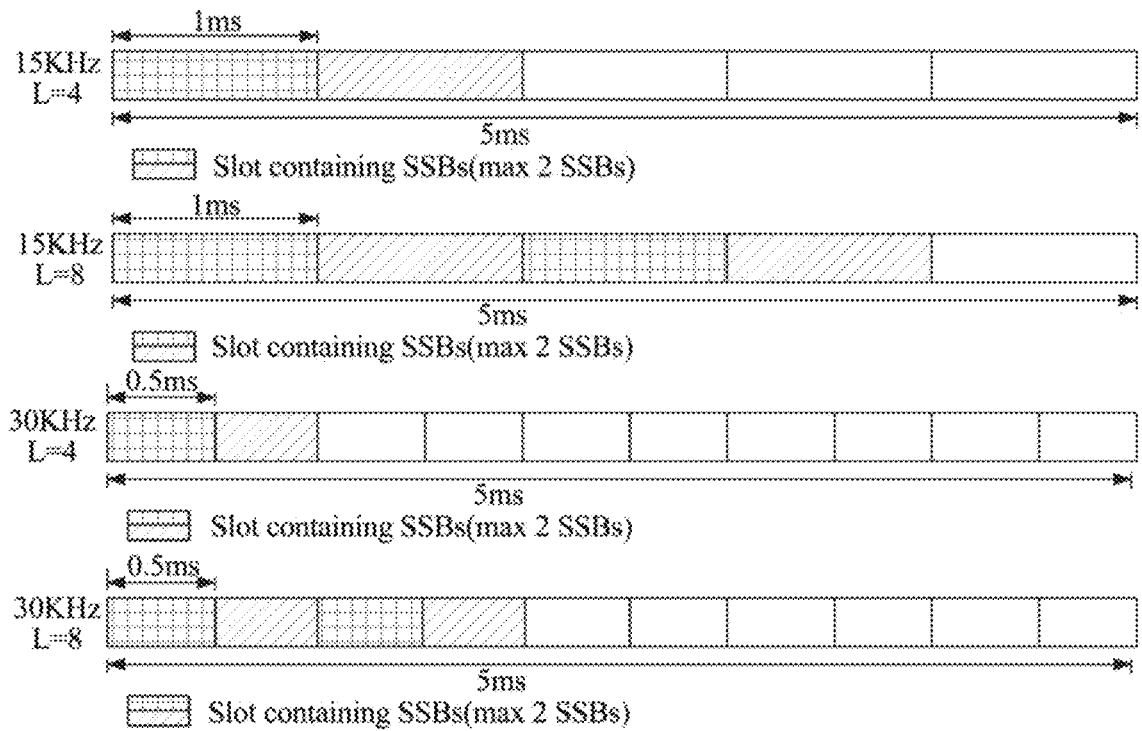
FIG. 1 is a schematic diagram of distribution of the SSB in a slot under different subcarrier spacings and different operating frequency bands in prior art.
Figure 2:
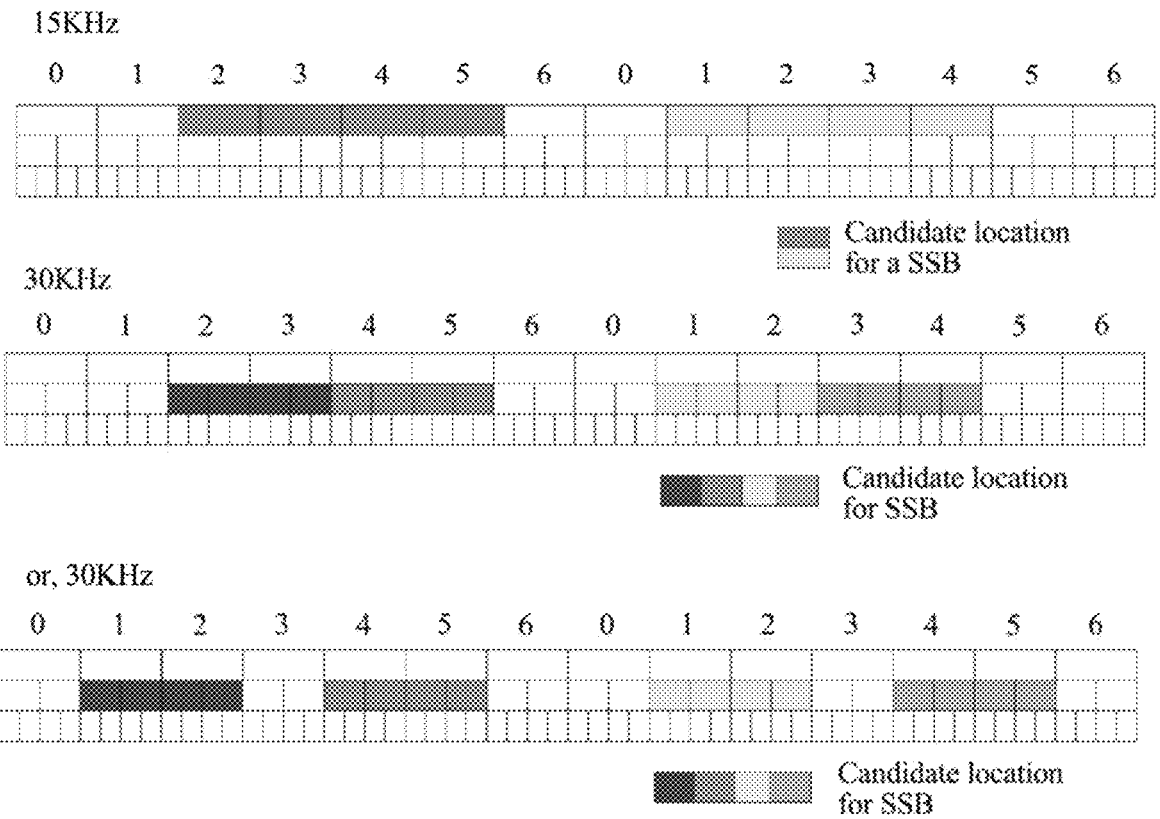
FIG. 2 is a schematic diagram showing the distribution of candidate locations for the SSB within one slot when a subcarrier spacing is 15 KHz and 30 KHz respectively in prior art.
Figure 3:
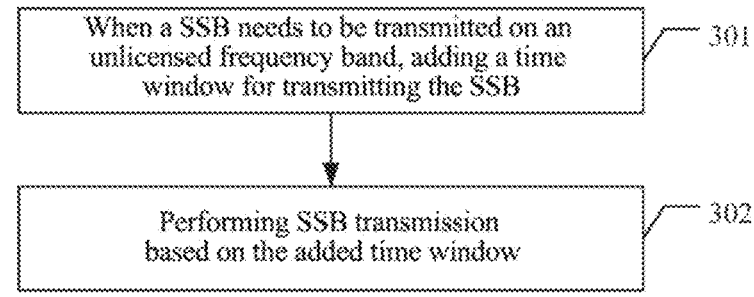
FIG. 3 is a flowchart of an implementation of a method for SSB transmission according to the present disclosure.

FIG. 3 is a flowchart of an implementation of a method for SSB transmission according to the present disclosure. As shown in FIG. 3, it includes a following specific implementation mode.

In 301, when the SSB needs to be transmitted in an unlicensed frequency band, a time window for transmitting the SSB is added.

In 302, the SSB transmission is performed based on the added time window.

The executing subject of above implementation may be a network device.

In the above implementation, transmission opportunity of the SSB is increased by adding the time window for transmitting the SSB, thereby solving or alleviating a problem that the SSB may not be successfully transmitted in one SSB transmission period because the network device needs to perform the carrier sensing before transmitting the SSB in the unlicensed frequency band in the prior art, improving the transmission success rate of the SSB, etc.

Two specific implementation modes are provided in this implementation, which are described respectively below.

(1) Mode One

Based on an original first SSB transmission window with a predetermined duration, a second SSB transmission window with the same duration is added.

The original first SSB transmission window with the predetermined duration is an existing SSB transmission window of 5 ms, and an additional SSB transmission window of 5 ms may be added on a basis of the existing SSB transmission window of 5 ms. For convenience of distinction, the existing SSB transmission window of 5 ms is referred to as the first SSB transmission window, and the added SSB transmission window of 5 ms is referred to as the second SSB transmission window.

The first SSB transmission window and the second SSB transmission window may be located in a same radio frame and are respectively located in different half frames in the radio frame.

According to an existing mode, the first SSB transmission window may be located in a first half frame or a second half frame of the radio frame. If the first SSB transmission window is located in the first half frame, the second SSB transmission window may be located in the second half frame. If the first SSB transmission window is located in the second half frame, the second SSB transmission window may be located in the first half frame.

Or, the first SSB transmission window and the second SSB transmission window are located in two adjacent radio frames and in two adjacent half frames.

For example, the first SSB transmission window and the second SSB transmission window are respectively located in a radio frame a and a radio frame a'. The radio frame a and the radio frame a' are adjacent radio frames. The first SSB transmission window is located in the second half frame in the radio frame a, and the second SSB transmission window is located in the first half frame in the radio frame a'.

Preferably, indications of half frames of SSBs with a same number appearing in the first SSB transmission window and the second SSB transmission window are different, and other indications are same.

In addition, the distributions of candidate locations for the SSB within the first SSB transmission window and the second SSB transmission window are consistent, and/or the distributions of actual locations for the SSB within the first SSB transmission window and the second SSB transmission window are consistent. That is, the distributions of the candidate locations for the SSB within the first SSB transmission window and the second SSB transmission window may be consistent, or, the distributions of the actual locations for the SSB within the first SSB transmission window and the second SSB transmission window are consistent, or, the distributions of the candidate locations for the SSB within the first SSB transmission window and the second SSB transmission window are consistent, and the distributions of the actual locations for the SSB within the first SSB transmission window and the second SSB transmission window are consistent, that is, the second SSB transmission window and the first SSB transmission window are completely consistent.

As mentioned above, L is a maximum quantity of SSBs that may be transmitted in one SSB transmission period, and the candidate location for the SSB is set according to L. But in the actual application, the quantity of the SSBs to be transmitted is likely to be less than L, which requires selecting a part of the candidate locations for the SSB as the actual location for the SSB. How to perform selection belongs to the prior art.

In the prior art, the network device will notify a terminal of the actual location for the SSB through Remaining Minimum System Information (RMSI) or Radio Resource Control (RRC) signaling, so that the terminal obtains a location at which the network device will transmit the SSB, thus performing the corresponding processing, etc. Since the distributions are consistent, the terminal may obtain the actual location for the SSB within the added second SSB transmission window based on the actual location for the SSB within the first SSB transmission window notified by the network device.

Figure 4:
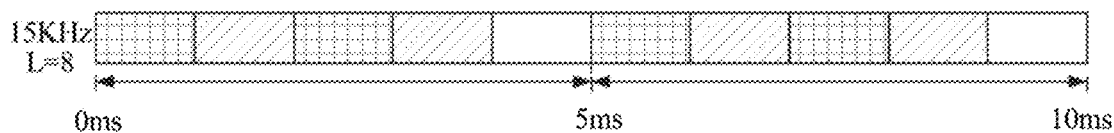
FIG. 4 is a schematic diagram of a first SSB transmission window and a second SSB transmission window according to the present disclosure.

FIG. 4 is a schematic diagram of a first SSB transmission window and a second SSB transmission window according to the present disclosure. As shown in FIG. 4, assuming that an operating frequency band is 3 GHz to 6 GHz, a subcarrier spacing is 15 KHz and L=8, and assuming that the first SSB transmission window is located in a first half frame of a radio frame, then the second SSB transmission window is located in a second half frame of the radio frame, and moreover, the distributions of candidate locations for the SSB and the distributions of actual locations for the SSB within the second SSB transmission window and the first SSB transmission window are both consistent.

A network device may perform the SSB transmission based on the existing LBT mechanism and the added time window.

Specifically, a transmission attempt may be made at the actual location for the SSB within the first SSB transmission window firstly. Assuming that there are two SSBs to be transmitted, SSB1 and SSB2 respectively, wherein the SSB1 is transmitted successfully and the SSB2 is not transmitted successfully, and then a transmission attempt may be continued to perform at the actual location for the SSB within the second SSB transmission window. For example, the transmission attempt may be made for the SSB2 at an actual location for the SSB corresponding to the SSB2, or be made respectively for the SSB1 and the SSB2 at actual locations for the SSB corresponding to the SSB1 and the SSB2 respectively. Specific implementation mode is not limited. In this way, for each SSB, the transmission opportunity is doubled, thus improving the success rate of the SSB transmission.

In addition, before adding the time window for transmitting the SSB, the network device may also firstly determine whether the time window for transmitting the SSB needs to be added. If yes, the time window for transmitting the SSB is added.

The network device also needs to notify the terminal of a determination result, for example, through broadcast information. If the determination result is yes, the terminal may receive the SSB based on the added time window. If the determination result is no, the terminal may perform the SSB reception based on an original time window, such as cell detection, cell time-frequency synchronization, and cell measurement, etc.

The network device may determine whether the time window for transmitting the SSB needs to be added according to a current channel load situation. For example, if the network device learns that success rate of channel sensing for a period of time is high according to a channel sensing situation of that period of time, then it may determine that the system load on a carrier is low. Thus the second SSB transmission window may not be added. On the contrary, if the success rate of the channel sensing of that period of time is low, the network device may determine that the system load on the carrier is high, and thus add the second SSB transmission window.

(2) Mode Two

Within an original first SSB transmission window with predetermined duration, a time window for transmitting SSB is added.

The original first SSB transmission window with the predetermined duration is an existing SSB transmission window of 5 ms, and the time window for transmitting the SSB may be added within the first SSB transmission window. Within the first SSB transmission window, the SSB adopts a floating transmission mode.

For example, if the duration of a first time window occupied by candidate locations for the SSB is less than or equal to ½ of the duration of the first SSB transmission window, a second time window with the same duration as the first time window may be added after the first time window.

Distributions of candidate locations for the SSB within the second time window and the first time window are consistent, and/or distributions of actual locations for the SSB within the second time window and the first time window are consistent. Preferably, the distributions of the candidate locations for the SSB within the second time window and the first time window are consistent, and the distributions of the actual locations for the SSB within the second time window and the first time window are consistent.

Figure 5:
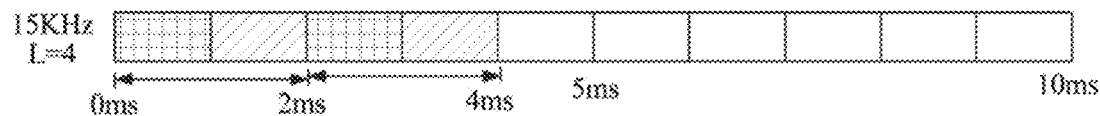
FIG. 5 is a schematic diagram of a first time window and a second time window according to the present disclosure.

FIG. 5 is a schematic diagram of a first time window and a second time window according to the present disclosure. As shown in FIG. 5, assuming a subcarrier spacing is 15 KHz, L=4, and the duration of a first time window occupied by candidate locations for the SSB is 2 ms, then a second time window of 2 ms may be added after the first time window.

For another example, if the duration of the first time window occupied by the candidate locations for the SSB is greater than ½ of the duration of the first SSB transmission window, but the duration of a third time window occupied by the actual locations for the SSB is less than or equal to ½ of the duration of the first SSB transmission window, then a fourth time window with the same duration as the third time window may be added after the third time window.

Distributions of candidate locations for the SSB within the third time window and the fourth time window are consistent, and/or distributions of actual locations for the SSB within the third time window and the fourth time window are consistent. Preferably, the distributions of the candidate locations for the SSB within the third time window and the fourth time window are consistent, and the distributions of the actual locations for the SSB within the third time window and the fourth time window are consistent.

Assuming that the subcarrier spacing is 15 KHz, L=8, and the duration of the first time window occupied by the candidate locations for the SSB is 4 ms, but the duration of the third time window occupied by the actual locations for the SSB is only 2 ms, i.e. the network-based implementation of actually transmitted SSB only occurs in first 2 ms, then a fourth time window of 2 ms may be added after the 2 ms.

In addition, in order for the terminal to obtain an accurate frame timing according to the SSB transmitted in the added time window, the network device also needs to notify the terminal of a time offset, relative to a predetermined location, of the SSB transmitted within the added time window.

The time offset relative to the predetermined location may include: a time offset relative to a starting location of a half frame where the first SSB transmission window is located, or, a time offset relative to an existing time location of an SSB having a same number. As in above example, the time offset relative to the starting location of the half frame where the first SSB transmission window is located is 2 ms.

Preferably, bits reserved in a PBCH in an SSB may be used to indicate the time offset. For example, 1 bit may be adopted to indicate two states: a, no time offset, b, a time offset of 2 ms. Or, 2 bits may be adopted to indicate four states: a, no time offset, b, a time offset of 1 ms, c, a time offset of 2 ms, c, a time offset of 3 ms.

In addition, before adding the time window for transmitting the SSB, the network device also may firstly determine whether the time window for transmitting the SSB needs to be added. If yes, the time window for transmitting the SSB is added. And the network device needs to notify the terminal no matter what a determination result is, for example, the network device may notify the terminal through broadcast information.

The network device may determine whether the time window for transmitting the SSB needs to be added according to a current channel load situation. For example, the network device learns that the success rate of channel sensing for a period of time is high according to the channel sensing situation for that period of time. Then the network device may determine that system load on a carrier is low. Thus the second time window or the fourth time window may not be added. On the contrary, if the success rate of the channel interception for that period of time is low, the network device may determine that the system load on the carrier is high, thus adding the second time window or the fourth window.

What is described above is the description of method implementations, and the solution of the present disclosure will be further described through apparatus implementations below.

Figure 6:
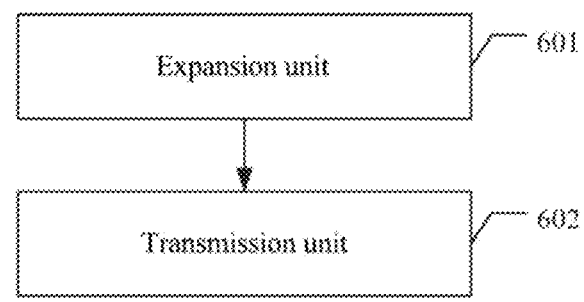
FIG. 6 is a schematic diagram of structure of an implementation of a network device according to the present disclosure.

FIG. 6 is a schematic diagram of structure of a network device according to an implementation of the present disclosure. As shown in FIG. 6, it includes an expansion unit 601 and a transmission unit 602.

The expansion unit 601 is configured to add a time window for transmitting SSB when the SSB needs to be transmitted in an unlicensed frequency band.

The transmission unit 602 is configured to perform an SSB transmission based on the added time window.

Specifically, the expansion unit 601 may add a second SSB transmission window with a same duration based on an original first SSB transmission window with a predetermined duration.

The first SSB transmission window and the second SSB transmission window may be located in a same radio frame and are respectively located in different half frames in the radio frame. Or, the first SSB transmission window and the second SSB transmission window are located in two adjacent radio frames and in two adjacent half frames. Preferably, indications of half frames of SSBs with a same number appearing in the first SSB transmission window and the second SSB transmission window are different.

In addition, the distributions of candidate locations for the SSB within the first SSB transmission window and the second SSB transmission window are consistent, and/or the distribution of actual locations for the SSB within the first SSB transmission window and the second SSB transmission window are consistent.

Or, the expansion unit 601 may also add the time window for transmitting the SSB within the original first SSB transmission window with the predetermined duration.

For example, if the duration of the first time window occupied by the candidate locations for the SSB is less than or equal to ½ of duration of the first SSB transmission window, the expansion unit 601 may add a second time window with a same duration as the first time window after the first time window.

The distributions of the candidate locations for the SSB within the second time window and the first time window are consistent, and/or the distributions of the actual locations for the SSB within the second time window and the first time window are consistent.

For another example, if the duration of the first time window occupied by the candidate locations for the SSB is greater than ½ of the duration of the first SSB transmission window, but the duration of a third time window occupied by the actual location for the SSB is less than or equal to ½ of the duration of the first SSB transmission window, the expansion unit 601 may add a fourth time window with a same duration as the third time window after the third time window.

Distributions of candidate locations for the SSB within the third time window and the fourth time window are consistent, and/or distributions of actual locations for the SSB within the third time window and the fourth time window are consistent.

The transmission unit 602 also needs to notify a terminal of a time offset, relative to a predetermined location, of an SSB transmitted in the added time window so that the terminal may obtain an accurate frame timing according to the SSB.

The time offset relative to the predetermined location may include: a time offset relative to a starting location of a half frame where the first SSB transmission window is located, or a time offset relative to a time location of an SSB having a same number.

The transmission unit 602 may indicate the time offset through reserved bits in a PBCH in an SSB.

In addition, in a practical application, the expansion unit 601 may also firstly determine whether the time window for transmitting the SSB needs to be added, and if yes, add the time window for transmitting the SSB and notify the terminal.

For example, the expansion unit 601 may determine whether the time window for transmitting the SSB needs to be added according to a current channel load situation.

The transmission unit 602 may perform the SSB transmission based on the added time window, based on an existing LBT mechanism.

Figure 7:
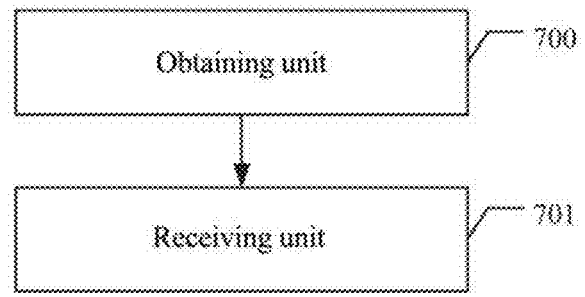
FIG. 7 is a schematic diagram of structure of an implementation of a terminal device according to the present disclosure.

FIG. 7 is a schematic diagram of structure of a network device according to an implementation of the present disclosure. As shown in FIG. 7, it includes a receiving unit 701.

The receiving unit 701 is configured to receive an SSB based on a time window for transmitting the SSB, wherein the time window is added by a network side.

The adding may include: on a basis of an original first SSB transmission window with a predetermined duration, adding a second SSB transmission window with the predetermined duration.

The first SSB transmission window and the second SSB transmission window may be located in a same radio frame and are respectively located in different half frames in the radio frame. Or, the first SSB transmission window and the second SSB transmission window are located in two adjacent radio frames and in two adjacent half frames. Preferably, indications of half frames of SSBs with a same number appearing in the first SSB transmission window and the second SSB transmission window are different.

In addition, distributions of candidate locations for the SSB within the first SSB transmission window and the second SSB transmission window are consistent, and/or distributions of actual locations for the SSB within the first SSB transmission window and the second SSB transmission window are consistent.

When the distributions of the actual location for the SSB within the first SSB transmission window and the second SSB transmission window are consistent, the receiving unit 701 may obtain the actual location for the SSB within the second SSB transmission window according to the actual location for the SSB within the first SSB transmission window notified by the network side through RMSI or RRC signaling.

Or, the adding may further include: adding the time window for transmitting the SSB within an original first SSB transmission window with a predetermined duration.

In this case, the receiving unit 701 also needs to obtain a time offset, relative to a predetermined location, of an SSB transmitted within the added time window notified by the network side to obtain an accurate frame timing. The time offset relative to the predetermined location may include: a time offset relative to a starting location of a half frame where the first SSB transmission window is located, or a time offset relative to a time location of an SSB having a same number.

In addition, as shown in FIG. 7, the terminal device may further include an obtaining unit 700.

The obtaining unit 700 is configured to obtain a determination result notified by the network side after determining whether the time window for transmitting the SSB needs to be added. If the determination result is yes, the receiving unit 701 may perform the SSB reception based on the added time window. If the determination result is no, the receiving unit 701 may receive the SSB based on the original time window.

Please refer to the corresponding description in above-described method implementations for specific work flows of the apparatus implementations showed in FIG. 6 and FIG. 7, which are not repeated here.

In a word, by adopting the solution described in the above apparatus implementation, the transmission opportunity of the SSB is increased by adding the time window for transmitting the SSB, thus improving the transmission success rate of the SSB, etc.

Figure 8:
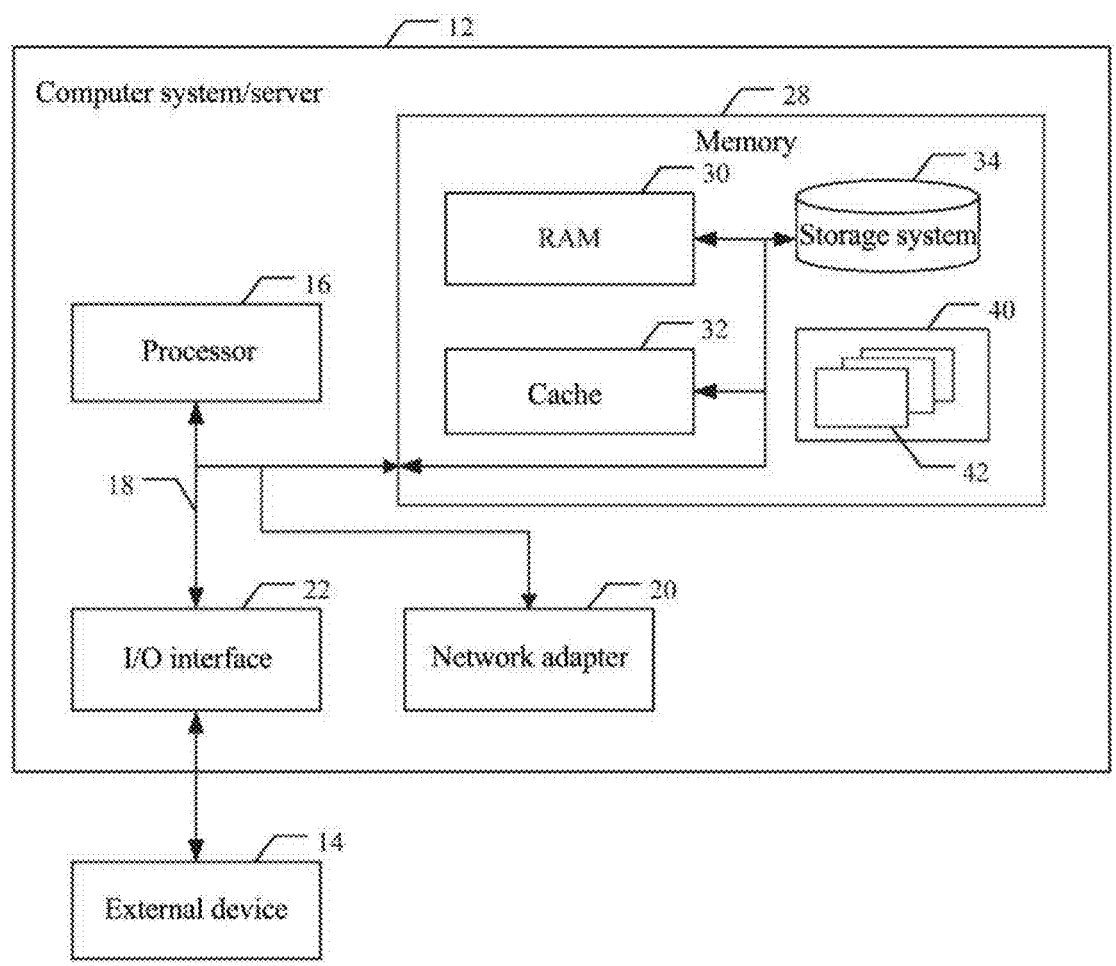
FIG. 8 shows a block diagram of an exemplary computer system/server 12 suitable for implementing implementations of the present disclosure.

FIG. 8 shows a block diagram of an exemplary computer system/server 12 suitable for implementing implementations of the present disclosure. The computer system/server 12 shown in FIG. 8 is only an example and should not impose any restrictions on the functions and scope of use of the implementations of the present disclosure.

As shown in FIG. 8, the computer system/server 12 is represented in the form of a general-purpose computing device. Components of the computer system/server 12 may include, but are not limited to, one or more processors (processing units) 16, a memory 28, and a bus 18 connecting different system components (including the memory 28 and the processor 16).

The bus 18 represents one or more of several types of bus structures, including a memory bus or memory controller, a peripheral bus, a graphics acceleration port, a processor, or a local bus using any of a variety of bus structures. For example, these architectures include, but are not limited to, Industry Standard Architecture (ISA) bus, Micro Channel Architecture (MAC) bus, Enhanced ISA bus, Video Electronics Standards Association (VESA) local bus, and Peripheral Component Interconnect (PCI) bus.

The computer system/server 12 typically includes a variety of computer system readable media. These media may be any available media that may be accessed by the computer system/server 12, including transitory and non-transitory media, removable and non-removable media.

The memory 28 also may include computer system readable media in the form of a transitory memory, such as a Random Access Memory (RAM) 30 and/or a cache memory 32. The computer system/server 12 may further include other removable/non-removable, transitory/non-transitory computer system storage media. By way of example only, a storage system 34 may be configured to read from and write into non-removable, non-transitory magnetic media (not shown in FIG. 8, usually referred to as a "hard disk drive"). Although not shown in FIG. 8, a magnetic disk drive for reading from and writing into a removable non-transitory magnetic disk (e.g., "floppy disk") and an optical disk drive for reading from and writing into a removable non-transitory optical disk (e.g., CD-Rom, DVD-ROM, or other optical media) may be provided. In these cases, each drive may be connected to the bus 18 through one or more data media interfaces. The memory 28 may include at least one program product having a group (e.g., at least one) of program modules configured to perform functions of any implementation of the present application.

A program/utility 40 having a group (at least one) of program modules 42 may be stored in, for example, the memory 28. Such program module 42 includes, but is not limited to, an operating system, one or more application programs, other program modules, and program data. An implementation of a network environment may be included in each or some combination of these examples. Program module 42 generally performs functions and/or methods in the implementations described by the present disclosure.

The computer system/server 12 also may communicate with one or more external devices 14 (e.g., keyboard, pointing device, display 24 and the like), with one or more devices that enable a user to interact with the computer system/server 12, and/or with any device (e.g., network card, modem and the like) that enables the computer system/server 12 to communicate with one or more other computing devices. This communication may be performed through an input/output (I/O) interface 22. Also, the computer system/server 12 also may communicate with one or more networks (e.g., local area network (LAN), wide area network (WAN), and/or public network, e.g., internet) through the network adapter 20. As shown in FIG. 8, the network adapter 20 communicates with other modules of the computer system/server 12 via the bus 18. It should be understood that, although not shown in the figure, other hardware and/or software modules may be used in conjunction with the computer system/server 12, including but not limited to microcode, device driver, redundant processing unit, external disk drive arrays, RAID system, tape drive and data backup storage system, etc.

The processor 16 executes various functional applications and data processing by running programs stored in the memory 28, such as implementing the method in the implementation shown in FIG. 3.

The present disclosure also discloses a computer readable storage medium on which a computer program is stored. When the computer program is executed by a processor, the method in the implementation shown in FIG. 3 will be implemented.

Any combination of one or more computer readable media may be employed. The computer readable medium may be a computer readable signal medium or a computer readable storage medium. The computer readable storage medium may be, for example, but not limited to, an electrical, magnetic, optical, electromagnetic, infrared, or semiconductor system, apparatus, or device, or any combination thereof. Specific examples of the computer readable storage media (a non-exhaustive list) include: electrical connections with one or more wires, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices, or any suitable combination of the above. In this disclosure, the computer readable storage medium may be any tangible medium containing or storing a program that may be used by or in connection with an instruction execution system, apparatus, or device.

The computer readable signal medium may include data signals propagated in a baseband or as part of a carrier, in which computer readable program codes are carried. Such propagated data signals may take many forms, including, but not limited to, electromagnetic signals, optical signals, or any suitable combination of the above. The computer-readable signal medium also may be any computer-readable medium except for computer-readable storage medium, which may be used for sending, propagating, or transmitting programs used by or in connection with an instruction execution system, apparatus, or device.

Program codes contained in the computer readable medium may be transmitted using any suitable medium, including, but not limited to, wireless, wire, fiber optic cable, RF, etc., or any suitable combination thereof.

Computer program codes for executing operations of the present disclosure may be written in one or more programming languages or combinations thereof, including object-oriented programming languages such as Java, Smalltalk, C++, as well as conventional procedural programming languages such as "C" language or similar programming languages. The program codes may be executed entirely on a user computer, partially on the user computer, as an independent software package, partially on the user computer and partially on a remote computer, or entirely on the remote computer or a server. In the case of a remote computer, the remote computer may be connected to the user computer through any kind of network, including a local area network (LAN) or a wide area network (WAN), or may be connected to an external computer (e.g., via the internet using an internet service provider).

In several implementations provided by the present disclosure, it should be understood that the disclosed apparatuses and methods and the like may be implemented in other ways. For example, the apparatus implementations described above are just exemplary. For example, the division of units is just a division of logical functions. There may be other division modes during an actual implementation.

The unit described as a separate component may or may not be physically separated, and a component shown as the unit may or may not be a physical unit, i.e., it may be located in one place or may be distributed over multiple network units. Some or all of the units may be selected according to actual needs to achieve a purpose of solutions of the implementations.

In addition, various functional units in various implementations of the present disclosure may be integrated in one processing unit, or various units may be physically present separately, or two or more units may be integrated in one unit. The integrated units may be implemented in a form of hardware or in a form of hardware plus software functional units.

The integrated units implemented in the form of software functional units may be stored in a computer readable storage medium. The above-mentioned software functional units are stored in a storage medium including several instructions for causing a computer device (which may be a personal computer, a server, or a network device and so on) or a processor to perform parts of acts of the methods described in various implementations of the present disclosure. The aforementioned storage medium includes various mediums capable of storing program codes, such as, a U disk, a mobile hard disk, a read-only memory (ROM), a random-access memory (RAM), a magnetic disk or an optical disk, etc.

The above description is only preferred implementations of the present disclosure, and is not intended to limit the present disclosure. Any modification, equivalent substitution, improvement and the like made within spirit and principle of the present disclosure shall be included in the protection scope of the present disclosure.

What is claimed is:

1. A method for transmitting a synchronization signal block (SSB), comprising:
adding a time window for transmitting the SSB, when the SSB needs to be transmitted in an unlicensed frequency band; and
performing an SSB transmission based on the added time window,
wherein the adding the time window for transmitting the SSB comprises: adding the time window for transmitting the SSB within an original first SSB transmission window with a predetermined duration,
wherein the SSB is jointly constituted by a Primary Synchronization Signal (PSS), a Secondary Synchronization Signal (SSS) and a Physical Broadcast Channel (PBCH),
wherein if a duration of a first time window occupied by candidate locations for the SSB is greater than ½ of the duration of the first SSB transmission window, but a duration of a third time window occupied by actual locations for the SSB is less than or equal to ½ of the duration of the first SSB transmission window, a fourth time window is added with a same duration as the third time window after the third time window,
wherein distributions of candidate locations for the SSB within the third time window and the fourth time window are consistent;
and/or distributions of actual locations for the SSB within the third time window and the fourth time window are consistent.

2. A network device, comprising: a processor and an input/output interface;
wherein the processor is configured to add a time window for transmitting a synchronization signal block (SSB) when the SSB is needed to be transmitted in an unlicensed frequency band; and
the input/output interface is configured to perform an SSB transmission based on the added time window,
wherein the processor is configured to, add the time window for transmitting the SSB within an original first SSB transmission window with a predetermined duration,
wherein the SSB is jointly constituted by a Primary Synchronization Signal (PSS), a Secondary Synchronization Signal (SSS) and a Physical Broadcast Channel (PBCH),
wherein if a duration of a first time window occupied by candidate locations for the SSB is greater than ½ of the duration of the first SSB transmission window, but a duration of a third time window occupied by actual locations for the SSB is less than or equal to ½ of the duration of the first SSB transmission window, the processor is configured to add a fourth time window with a same duration as the third time window after the third time window,
wherein distributions of candidate locations for the SSB within the third time window and the fourth time window are consistent;
and/or distributions of actual locations for the SSB within the third time window and the fourth time window are consistent.

3. The network device according to claim 2, wherein,
if a duration of a first time window occupied by candidate locations for the SSB is less than or equal to ½ of the duration of the first SSB transmission window, the processor is configured to add a second time window with a same duration as the first time window after the first time window, wherein distributions of candidate locations for the SSB within the second time window and the first time window are consistent;

and/or distributions of actual locations for the SSB within the second time window and the first time window are consistent.

4. The network device of claim 2, wherein, the input/output interface is further configured to notify a terminal of a time offset, relative to a predetermined location, of an SSB transmitted within the added time window.

5. The network device of claim 4, wherein, the time offset relative to the predetermined location comprises:

a time offset relative to a starting location of a half frame where the first SSB transmission window is located;

or, a time offset relative to a time location of an SSB with a same number.

\* \* \* \* \*